No. 617,235. Patented Jan. 3, 1899.
S. R. DIVINE.
METHOD OF AND DEVICE FOR PRESERVING FRUIT FROM DAMAGE IN SHIPMENT.
(Application filed Aug. 11, 1898.)
(No Model.)

WITNESSES
INVENTOR
S. R. Divine
BY
ATTORNEYS.

UNITED STATES PATENT OFFICE.

SILAS R. DIVINE, OF LOCH SHELDRAKE, NEW YORK.

METHOD OF AND DEVICE FOR PRESERVING FRUIT FROM DAMAGE IN SHIPMENT.

SPECIFICATION forming part of Letters Patent No. 617,235, dated January 3, 1899.

Application filed August 11, 1898. Serial No. 688,383. (No model.)

*To all whom it may concern:*

Be it known that I, SILAS R. DIVINE, of Loch Sheldrake, in the county of Sullivan and State of New York, have invented a new and Improved Method of and Device for Preserving Fruit from Damage in Shipment, of which the following is a full, clear, and exact description.

The object of my invention is to provide a method and means whereby strawberries and other fruits liable to be bruised by contact in close packing may be sent to distant markets in good condition, each individual piece being independent of all others and securely held in predetermined position without danger of displacement in transportation.

A further object of the invention is to provide a method of packing and preserving fruit from injury during transportation that will under ordinary conditions not only insure the fruit reaching its destination in good condition, but which will also provide for the fruit being removed from the conveying-receptacles without injury to said fruit.

The invention consists in the novel method of preserving fruit and in the construction and combination of parts adapted for carrying out said method, as will be hereinafter fully set forth, and pointed out in the claims.

Reference is to be had to the accompanying drawings, forming a part of this specification, in which similar characters of reference indicate corresponding parts in both figures.

Figure 1:
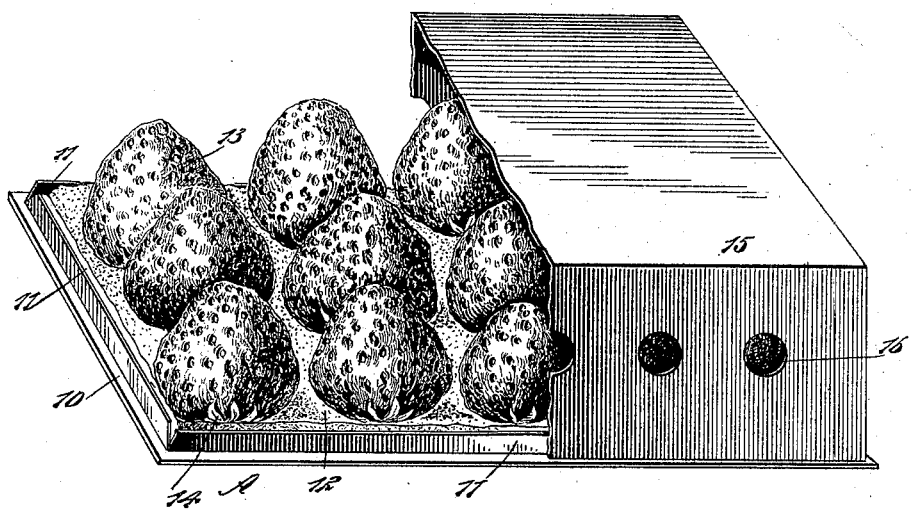
Figure 2:
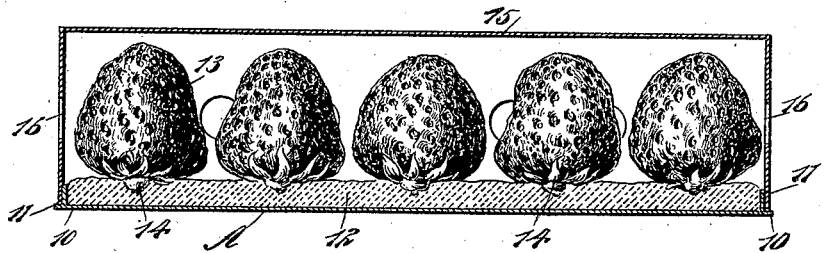

Figure 1 is a perspective view of the device employed for transporting fruit, a portion of the cover being broken away; and Fig. 2 is a longitudinal vertical section through the entire conveying device.

A represents a tray which is preferably provided near each margin with an upwardly-extending flange 11, thus providing for an extension-margin 10, as shown in both figures. A plastic compound 12, made from plaster-of-paris, sugar, or other material which is capable of application in a liquid state and which will solidify, is employed in connection with the tray, the said plastic material 12 being made to cover the tray within the boundaries of the flanges 11. While the plastic material is still in a moist or semifluid condition, the strawberries, if such fruit is to be transported, are placed in the moist plastic bed in such manner that their stems, caps, or calyxes will be practically embedded in the plastic compound. Thus when the plastic compound becomes hardened the berries will be held firmly upon the bed, the body or eatable portions of the berries not necessarily being brought in contact with the said compound. In placing the berries on the plastic bed they are placed at such intervals apart that a space will intervene adjacent berries.

Under such a method of packing or preparing fruit for transportation the fruit will not be dislodged under ordinary conditions of transportation, and when the fruit is desired for the table it may be readily detached from the stems, caps, or calyxes without injury to the fruit. In this manner fine specimens of fruit may be transported to distant points, arriving at their destination in excellent condition.

After the fruit has been set upon a tray the tray or trays may be placed in boxes of any desired construction to protect the fruit, and the said boxes are preferably provided with means for ventilation. In the drawings I have illustrated a single tray and a casing or cover 15 for the tray, so that the complete package may be shipped to any desired destination. The cover 15 in this instance is adapted to fit upon the extension-margin 10 outside of the flanges 11, and preferably in the sides of the cover 15 ventilating apertures or openings 16 are produced. The tray and its cover may be made of any desired material.

I desire it to be understood that this method of transporting choice fruit or fruit of any description is not only applicable to berries, but to any fruit that has a stem of sufficient length to be introduced and successfully set in the plastic bed 12.

Having thus described my invention, I claim as new and desire to secure by Letters Patent—

1. The herein-described method of packing fruit for transportation, which consists in embedding each stem, calyx or cap of the fruit in a plastic compound capable of hardening, for the purpose set forth.

2. The herein-described method of transporting fruit, which consists in providing a base, covering said base with a plastic compound capable of hardening, and introducing each stem, calyx or cap of the fruit in the plastic compound while yet moist, whereby the said compound when set will hold the stems, calyxes or caps, and consequently the fruit, in the position in which it may have been placed, as and for the purpose specified.

3. The combination, of a tray provided with a plastic bed, which plastic bed is adapted to receive the stems, calyxes or caps of the fruit, and a cover for the said bed, substantially as described.

4. The combination, of a bed, a plastic compound carried by the said bed, fruit, the stems, calyxes or caps whereof are introduced into and held by the plastic compound, and a ventilated cover for the said bed, substantially as described.

SILAS R. DIVINE.

Witnesses:
 JNO. B. FRENCH,
 W. L. GAMBLE.